United States Patent [19]

Ryczek

[11] Patent Number: 5,055,664

[45] Date of Patent: Oct. 8, 1991

[54] OPTICAL DISTANCE MEASURING SYSTEM USING A POSITION SENSITIVE DEVICE AND A RAMP GENERATOR DRIVEN LIGHT SOURCE

[75] Inventor: Lawrence J. Ryczek, Oconomowoc, Wis.

[73] Assignee: Eaton Corporation, Cleveland, Ohio

[21] Appl. No.: 563,419

[22] Filed: Aug. 6, 1990

[51] Int. Cl.$^5$ .............................................. G01J 1/20
[52] U.S. Cl. .................................... 250/201.4; 356/1
[58] Field of Search .............. 250/201.6, 201.4, 206.1, 250/206.2; 354/403; 356/1, 4

[56] References Cited

U.S. PATENT DOCUMENTS

| | | |
|---|---|---|
| 3,906,389 | 9/1975 | Matsumoto et al. |
| 4,389,565 | 6/1983 | Numata . |
| 4,445,029 | 4/1984 | Nagaoka et al. .................... 356/1 |
| 4,589,773 | 5/1986 | Ido et al. ............................ 356/1 |
| 4,652,107 | 3/1987 | Tamura . |
| 4,693,597 | 9/1987 | Shiomi et al. . |
| 4,708,483 | 11/1987 | Lorenz . |
| 4,721,384 | 1/1988 | Dietrich et al. .................... 356/1 |
| 4,723,073 | 2/1988 | Amikura et al. ................ 250/201.4 |
| 4,761,546 | 8/1988 | Ikari et al. . |
| 4,849,781 | 7/1989 | Nakazawa et al. ................ 356/1 |
| 4,855,585 | 8/1989 | Nonaka . |
| 4,909,624 | 3/1990 | Tsuru et al. . |
| 4,911,551 | 3/1990 | Morander . |
| 4,967,223 | 10/1990 | Suzuki ................................ 356/1 |

FOREIGN PATENT DOCUMENTS 57-44809 3/1982 Japan .
131412 1/1989 Japan .

OTHER PUBLICATIONS

Position-Sensitive Detectors, Hamamatsu Catalog, Apr. 1985.

Primary Examiner—David C. Nelms
Assistant Examiner—John R. Lee
Attorney, Agent, or Firm—Andrus, Sceales, Starke & Sawall

[57] ABSTRACT

An optical displacement measuring system including a PSD, position sensitive device, and having a pair of outputs providing electrical current I1 and I2 satisfying the equation $$x = \frac{I1 - I2}{I1 + I2}$$

where x is the position of a spot of light along a surface of the PSD reflected by a target from a light source which in turn gives the target distance by triangulation. A ramp generator U1A periodically generates an increasing ramp voltage periodically energizing the light source LED1 to pulse the light source between on and off states. A comparator U10 compares the Sum I1+I2 against a given threshold as the sum I1+I2 increases with increasing ramp voltage. Subtraction circuitry, U7 and U8B, samples I1 and samples I2 when the sum I1+I2 reaches the given threshold, and outputs the difference I1-I2 to provide a measure of x.

20 Claims, 6 Drawing Sheets

OPTICAL DISTANCE MEASURING SYSTEM USING A POSITION SENSITIVE DEVICE AND A RAMP GENERATOR DRIVEN LIGHT SOURCE

BACKGROUND AND SUMMARY

The invention relates to an optical displacement measuring system using a PSD, position sensitive device.

Optical displacement measuring systems using PSDs are known in the art, for example Hamamatsu Catalog APR/85. A PSD has a pair of outputs providing electrical current I1 and I2, FIG. 1, satisfying the equation $$x = \frac{I1 - I2}{I1 + I2}$$

where x is the position of a spot of infrared light along a surface of the PSD reflected by a target from a light source, which in turn gives the target distance by triangulation. For example, target 1 at distance d1 provides a reflected spot at position x1, FIG. 1, and target 2 at distance d2 provides a reflected spot at position x2. When the spot is in the center, I1=I2. As the spot moves toward the I2 terminal, the current I2 increases and the current I1 decreases. I1 and I2 are measured, and the sum I1+I2 and the difference I1−I2 are calculated by a computer or the like to solve the position equation for x. Alternatively, the sum I1+I2 is held constant, to normalize the denominator of the fraction in the above noted position equation, see Japanese Patent laid-open No. 13412-1989, and also see Japanese Patent laid-open No. 44809-1982. For a short range PSD, e.g., a target distance of about 0.05 inch to 0.25 inch, the light source is continuously on. For a long range PSD, e.g., a target distance up to about 4 inches, the light source is pulsed at a given duty cycle to prevent burnout due to the higher intensities required for longer range transmission.

The present invention provides an optical displacement measuring system with a long range PSD and a particularly simple and effective system for normalizing the denominator in the above noted position equation. The invention also provides improvements in linearity compensation, ambient light compensation, and out-of-range indication.

DETAILED DESCRIPTION

Figure 1:
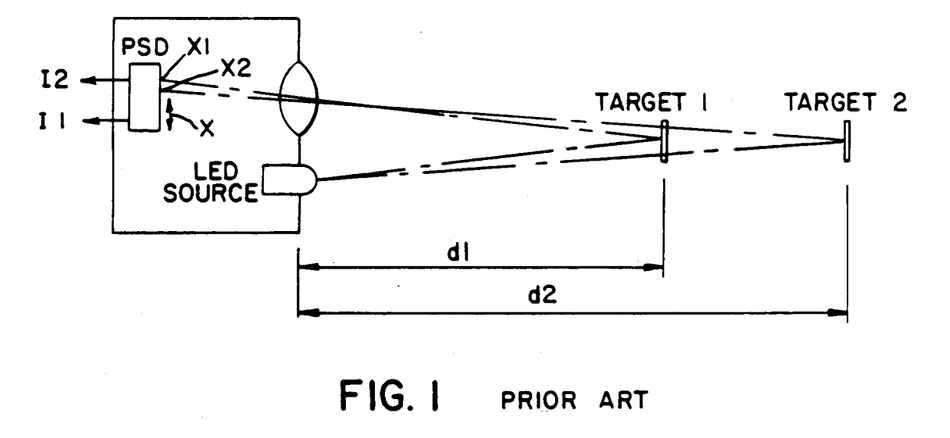
FIG. 1 schematically shows an optical displacement measuring system using a PSD, and is known in the prior art.
Figure 2:
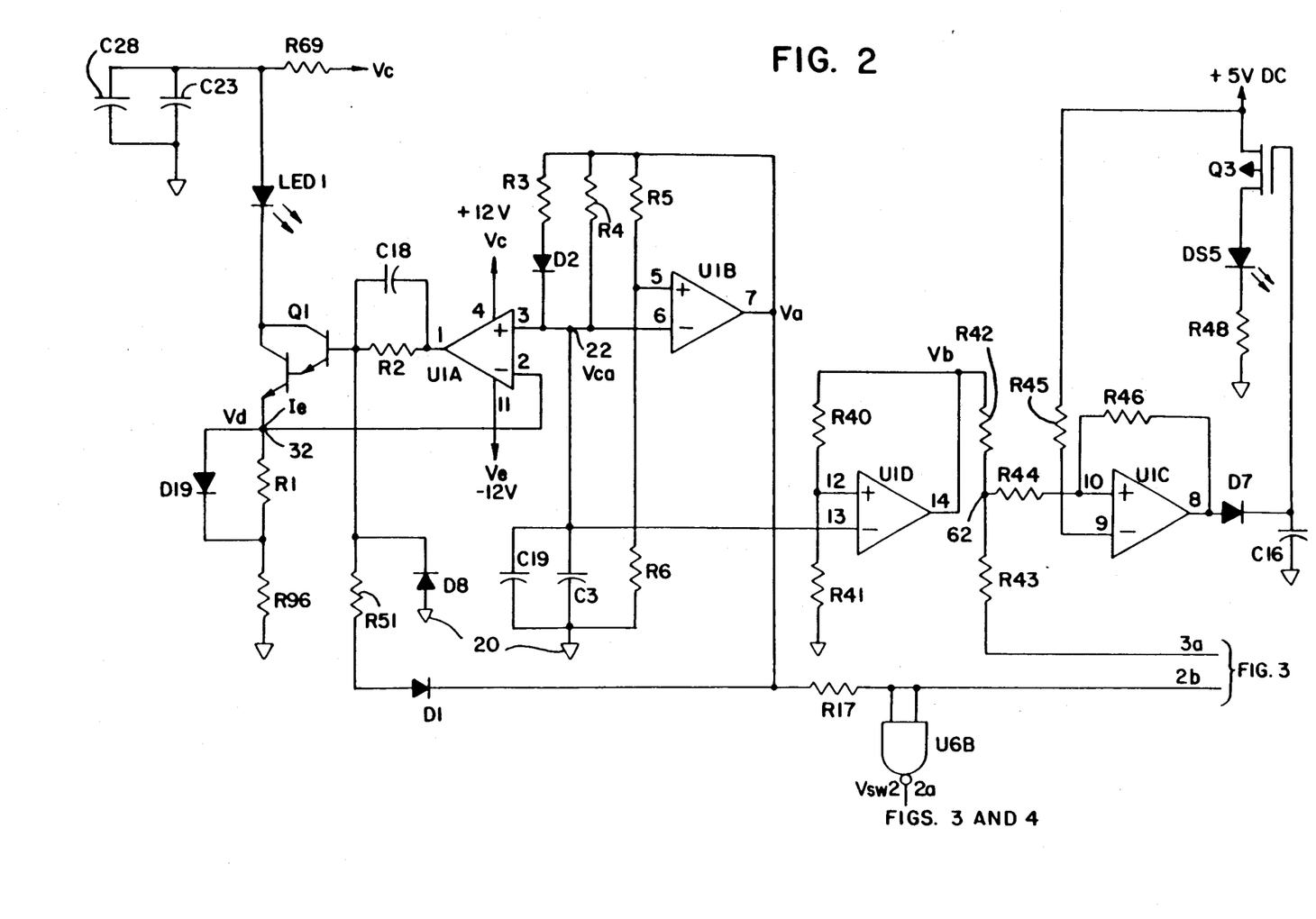
FIGS. 2-5 constitute a circuit diagram showing the optical displacement measuring system in accordance with the present invention.
Figure 3:
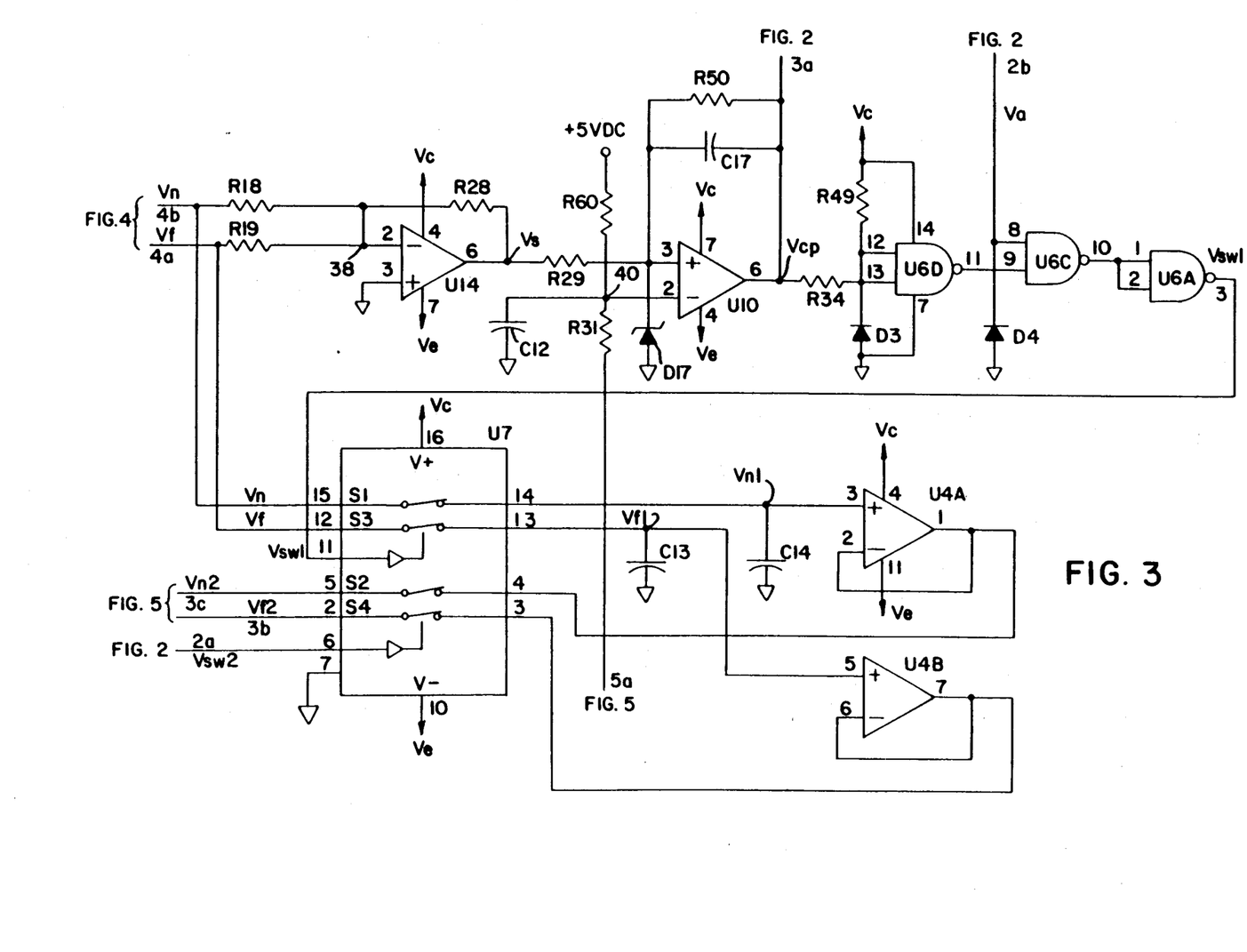
Figure 4:
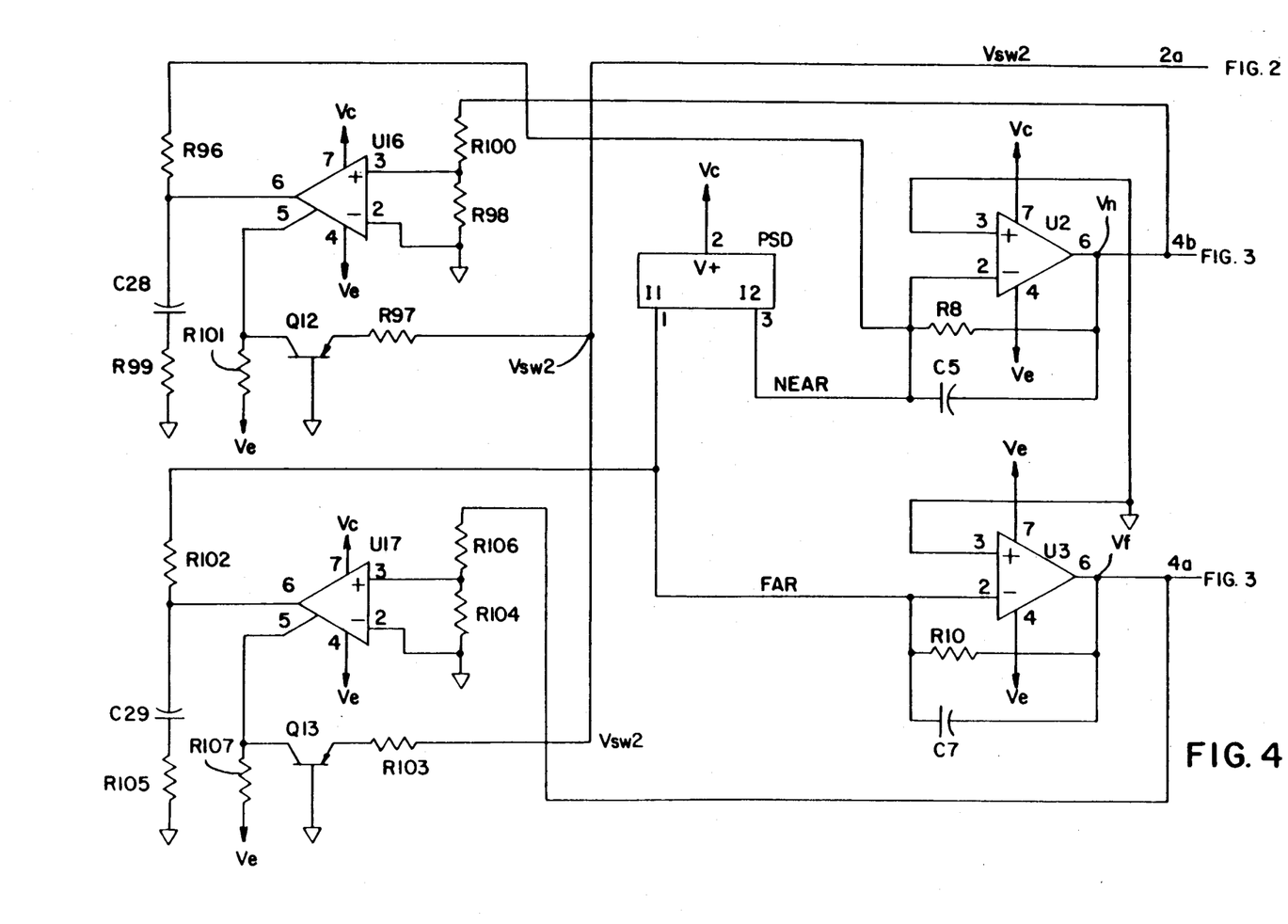

FIGS. 2-5 show an optical displacement measuring system including a position sensitive device, PSD, FIG. 4, provided by a Hamamatsu S-1771 PSD, where manufacturer assigned pin number designations are shown for this component, and for the remaining components described herein, to facilitate understanding. The PSD has a pair of outputs at pins 1 and 3 providing electrical current I1 and I2 satisfying the above noted position equation $$x = \frac{I1 - I2}{I1 + I2}$$

where x is the position of a spot of light along the surface of the PSD, FIG. 1, reflected by a target from a light source, which in turn gives the target distance by triangulation, all as known in the prior art, as above described. The light source is provided by a light emitting diode, LED1, FIG. 2, which is an L1939.

In FIG. 2, an oscillator is provided by operational amplifier U1B, which is a quarter of an MC34074 integrated circuit, and establishes the timing in the system. When power is initially applied to op amp U1B, input pins 5 and 6 will both be at zero volts. The noninverting input pin 5 of U1B is connected to output pin 7 of U1B through a voltage divider provided by resistors R5 and R6 which are connected to a common or ground reference 20. The inverting input pin 6 of U1B is connected to output pin 7 of U1B by a resistance-capacitance timing network provided by capacitors C3, C19, resistors R3, R4, and diode D2. These connections provide a positive feedback path which makes the circuit unstable when both inputs are at zero volts. Circuit disturbances or imperfections such as op amp offset voltage will always cause oscillations to start. For example, if output pin 7 of U1B is slightly negative when input pins 5 and 6 of U1B are both at zero volts, the feedback to pin 5 will make pin 5 negative with respect to pin 6 and cause output pin 7 of U1B to be driven negative until it is limited by saturation. The voltage at output pin 7 of U1B will remain in this stable negative state while the timing capacitors C3, C19 charge negatively from ground 20 through resistor R4, i.e., discharge through R4. When the voltage at pin 6 of U1B swings negative relative to pin 5, the op amp output voltage at pin 7 is driven to the positive saturation level and will remain in this stable state while timing capacitors C3, C19 charge positively through the combination of R4, R3 and D2. When pin 6 of U1B becomes positive relative to pin 5, the oscillation cycle will repeat. Diode D2 is placed in series with resistor R3 so that the positive part of the cycle is shorter than the negative part of the cycle.

Figure 6:
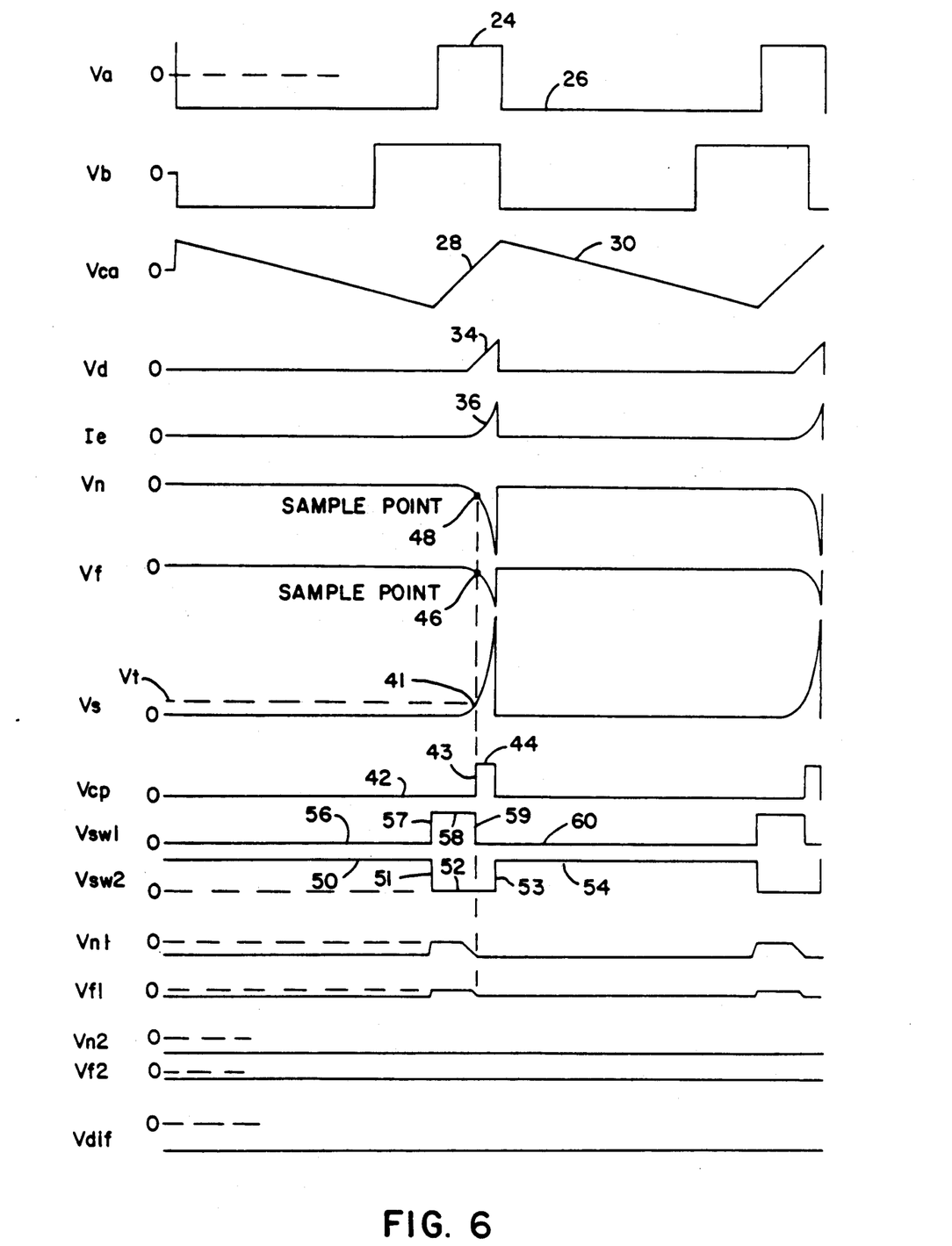
FIG. 6 is a waveform timing diagram illustrating operation of the circuit of FIGS. 2-5.

The oscillator output voltage waveform at pin 7 of U1B is shown at Va in FIG. 6. The timing capacitor voltage waveform at node 22, FIG. 2, is shown at Vca in FIG. 6. The oscillator thus has an output at pin 7 of U1B alternating between first and second states at a given frequency, for example high state 24, FIG. 6, and low state 26. Capacitors C3, C19 charge in one polarity, e.g., positively as shown at 28, FIG. 6, during the high state 24 of the oscillator output, and charge in the opposite polarity, e.g., negatively as shown at 30, FIG. 6, during the low state 26 of the oscillator output.

Operational amplifier U1A is provided by another quarter of the above noted MC34074 integrated circuit, and is biased between Vc at +12 volts at pin 4, and Ve at −12 volts at pin 11. Op amp U1A provides a ramp generator. Voltage waveform Vca at node 22 is fed to input pin 3 of op amp U1A. The other input at pin 2 of U1A is provided from node 32 at the emitter of a Darlington transistor Q1, which is an MJD122 integrated circuit. The output of op amp U1A at pin 1 is applied through resistor R2 and capacitor C18 to the base of transistor Q1 to bias the latter into conduction to conduct current from Vc through resistor R69, through LED1, through transistor Q1, through resistor R1 and diode D19, and through resistor R96. Capacitors C23 and C28 provide filtering to reduce current spikes. As voltage Vca at node 22 and input pin 3 of op amp U1A increases, FIG. 6, and rises above the voltage at pin 2 of op amp U1A, the voltage at output pin 1 of op amp U1A follows, and increases to turn on transistor Q1 such that the voltage Vd and current Ie at node 32 begin to rise as shown respectively at 34 and 36 in FIG. 6. The base of transistor Q1 is connected through resistor R51 and diode D1 to the oscillator output at pin 7 of op amp U1B such that voltage waveform Va is applied to the base of transistor Q1 to force transistor Q1 to the off state when the oscillator output voltage waveform Va is in the negative state 26, FIG. 6. Diode D8 is a clamp which limits the negative voltage swing at the base of transistor Q1 to one diode drop below the common or ground reference 20. Capacitor C18 is a speed up or leading phase capacitor allowing transistor Q1 to turn on sooner to prevent overshoot and compensate for ramp distortion otherwise caused by the input capacitance of transistor Q1. The circuit functions as a voltage follower which selects part of the Vc voltage waveform to generate waveform Vd. Transistor Q1 and the resistor-diode network provided by resistors R1, R96 and diode D19 in the emitter circuit serve as a current driver circuit for LED1. The resistor-diode network converts the ramp voltage Vd to a dual slope current pulse with waveform Ie. In the particular embodiment, when Vd is less than 0.65 volts, diode D19 will not be conducting, and the voltage-to-current conversion is given by Vd divided by the sum R1+R96. When Vd is greater than 0.65 volts, D19 will conduct and hold the voltage fairly constant across resistor R1, and the voltage-to-current conversion is the difference between Vd and the voltage drop across D19 divided by R96.

The ramp generator provided by op amp U1A periodically generates an increasing ramp voltage periodically energizing the light source LED1 to pulse LED1 between on and off states. Transistor Q1 provides a switch coupled to LED1 and responsive to a given level of charge on C3, C19 at node 22, voltage waveform Vca, to initiate energization of LED1 and to continue energization of LED1 to increasing intensity with increasing ramp voltage until the end of the oscillator output high state 24. The low state 26 of the oscillator output turns off transistor Q1 through resistor R51 and diode D1, such that LED1 is off during low state 26.

In FIG. 4, the PSD is biased by Vc at pin 2, and outputs far current I1 at pin 1, and outputs near current I2 at pin 3, respectively. Operational amplifier U3, provided by an MC34080 integrated circuit, converts I1 to voltage waveform Vf at output pin 6 on line 4a. Op amp U3 is connected in the inverting mode. Resistor R10 sets the gain of op amp U3, and capacitor C7 provides phase compensation. Operational amplifier U2, provided by an MC34080 integrated circuit, converts current I2 to voltage waveform Vn at output pin 6 on line 4b. Op amp U2 is connected in the inverting mode. Resistor R8 sets the gain of op amp U2, and capacitor C5 provides phase compensation. Voltages Vf and Vn are shown in FIG. 6.

The output voltage waveforms Vf and Vn from current-to-voltage converters U3 and U2 on lines 4a and 4b, FIG. 4, are applied through resistors R19 and R18, FIG. 3, to summing node 38 at the inverting input pin 2 of operational amplifier U14, which is an MC34080 integrated circuit. Feedback resistor R28 sets the gain of amplifier U14. The output of amplifier U14 at pin 6 is voltage waveform Vs, FIG. 6, which is the inverted sum of Vf+Vn, which represents the sum I1+I2.

Voltage comparator U10, provided by an AD849 integrated circuit, compares the sum I1+I2 against a given reference as the sum I1+I2 increases with increasing ramp voltage. Voltage waveform Vs, representing the sum I1+I2, is applied through resistor R29 to the plus input at pin 3 of comparator U10. This voltage is compared to the voltage on the minus input pin 2 of U10, which is a reference voltage at node 40 provided from a 5 volt source through resistor R60 and also provided through resistor R31 from line 5a, to be described. Capacitor C12 is a bypass capacitor which keeps the reference voltage at node 40 noise-free. When Vs exceeds a threshold voltage Vt, FIG. 6 at point 41, the output of comparator U10 at pin 6 goes high, as shown in FIG. 6 at voltage waveform Vcp transitioning at 43 from low state 42 to high state 44. Resistor R50 and capacitor C17 provide a small amount of positive feedback to the comparator U10 input at pin 3 so that the output at pin 6 will change state quickly. This gives a fast change at transition 43, FIG. 6, from low state 42 to high state 44, to enhance sampling point accuracy for sampled values of Vf and Vn, as shown at respective sample points 46 and 48, FIG. 6, to be described. Zener diode D17 provides a clamp to limit the voltage swing at pin 3 of comparator U10.

Gating circuitry responds to oscillator U1B and comparator U10 to provide logic level switching signals including gating signals during each cycle of the PSD's operation. NAND gate U6B, FIG. 2, provided by a quarter of an MC14011B integrated circuit, is connected as an invertor and receives the oscillator output voltage waveform Va from pin 7 of U1B through resistor R17, and generates voltage waveform Vsw2 on line 2a. As seen in FIG. 6, Vsw2 is the inversion of Va. Vsw2 transitions at 51 from high state 50 to low state 52 to mark the time that the rest interval ends and the sampling interval begins. Vsw2 transitions at 53 back to the high state at 54 to mark the end of the sample interval and the beginning of the next rest interval. Transition 51 is the beginning of the high state 24 of the oscillator output Va, and transition 53 is the end of such state and the beginning of the low state 26 of the oscillator output Va.

NAND gate U6D, FIG. 3, is provided by another quarter of the above noted MC14011B integrated circuit, and inverts the Vcp voltage waveform received through resistor R34 from output pin 6 of comparator U10, and converts it to appropriate logic levels. NAND gate U6C is provided by another quarter of the above noted MC14011B integrated circuit, and performs a gating function. NAND gate U6C receives at input pin 9 the output from pin 11 of U6D, and receives at input pin 8 the voltage waveform Va supplied through resistor R17, FIG. 2, on line 2b, to reference the sampling point to the beginning of the sampling interval instead of the end of the sampling interval. NAND gate U6A is provided by another quarter of the above noted MC14011B integrated circuit, and inverts the output of NAND gate U6C, to provide a voltage signal Vsw1 at output pin 3 of NAND gate U6A, which Vsw1 waveform is shown in FIG. 6. Resistors R17, FIG. 2, R34 and R49, FIG. 3, perform current limiting and voltage level shifting functions for connection of the outputs of op amp U1B and voltage comparator U10 to the inputs of the NAND gates U6A-D. Diodes D3 and D4, FIG. 3, are clamping devices to prevent excessive negative voltage from being applied to the inputs of the NAND gates at pins 12 and 13 of U6D, and pin 8 of U6C.

Referring to FIG. 6, waveform Vsw1 has a low state 56 which transitions at 57 to high state 58 and then transitions at 59 back to the low state at 60. Transition 57 occurs at the beginning of high state 24 of the oscillator output Va. Transition 59 occurs at transition 43 of Vcp which occurs before the end of oscillator high state 24, if Vs rises above Vt, as shown at 41. Oscillator U1B has a first output state 24, waveform Va, and a second output state 26. First output state 24 includes a first portion 58, waveform Vsw1, during which the sum I1+I2 increases to a given threshold, and a second portion 44, waveform Vcp, during which the sum I1+I2 continues to increase until the end of state 24 at transition 53, Vsw2.

Sample and hold circuitry samples I1 and samples I2 at the end 59, waveform Vsw1, FIG. 6, of the first portion 58 of oscillator state 24, and holds the sampled values of I1 and I2 until the end 53, waveform Vsw2, of the second portion 44 of oscillator state 24, and outputs the sampled and held values of I1 and I2 at the end 53 of second portion 44, waveform Vcp, of oscillator state 24, waveform Va.

The sample and hold circuitry includes an analog switch U7, FIG. 3, provided by a DG306A integrated circuit. Analog switch U7 responds at pins 11 and 6 to voltage waveforms Vsw1 and Vsw2, respectively, to perform the sampling functions. Analog switch U7 includes internal switches S1 through S4 which are controlled between open and closed states by gating signals at pins 11 and 6. When Vsw1 transitions high at 57, FIG. 6, input switches S3 and S1 close, to complete a circuit between pins 12 and 13 of U7 and a circuit between pins 15 and 14 of U7, to in turn apply respective voltage waveforms Vf and Vn on lines 4a and 4b to respective storage capacitors C13 and C14, FIG. 3. Vf is provided by output pin 6 of op amp U3, FIG. 4. Vn is provided by output pin 6 of U2, FIG. 4. When Vsw1 goes low at transition 59, FIG. 6, input switches S3 and S1 open, such that the then current values of Vf and Vn are stored in respective capacitors C13 and C14, as shown at Vf1 and Vn1, FIGS. 3 and 6. Operational amplifiers U4A and U4B are an LM324 integrated circuit, and are connected as voltage followers to act as buffers.

Output switches S4 and S2 of U7, FIG. 3, are opened at negative-going transition 51, FIG. 6, of Vsw2 coinciding with positive-going transition 57 of Vsw1. At the end of oscillator output state 24, Vsw2 transitions high at 53, which closes output switches S4 and S2 to connect pin 3 of U7 to pin 2, and pin 4 to pin 5, respectively, to thus provide the output from pin 7 of op amp U4B on line 3b, designated Vf2, and to provide the output from pin 1 of op amp U4A on line 3c, designated Vn2. Vf2 and Vn2 are supplied on lines 3b and 3c, respectively, from FIG. 3 to FIG. 5, and are stored by respective capacitors C2 and C1, FIG. 5, and applied to respective operational amplifiers U4D and U4C, provided by the above noted LM324 integrated circuit. Op amps U4D and U4C are connected as voltage followers to act as buffers between the holding capacitors C2 and C1 and the next stages. Output pin 14 of op amp U4D is connected through resistor R12 to the inverting input pin 6 of difference amplifier U8B, provided by a quarter of an LM324 integrated circuit. Output pin 8 of op amp U4C is connected through resistor R11 to the nonnverting input pin 5 of difference amplifier U8B. Difference amplifier U8B and the sample and hold components provide subtraction circuitry sampling I1 and sampling I2 when the sum I1+I2 reaches a given threshold, transition 43 of Vcp, FIG. 6, and outputting the difference I1-I2 to provide a measure of x.

Storage capacitors C13, C14, FIG. 3, respectively store Vf, Vn at the end 59, waveform Vsw1, FIG. 6, of the first portion 58 of oscillator state 24, waveform Va. Input switches S3, S1, FIG. 3, are connected between current-to-voltage converters U3, U2, FIG. 4, and respective storage capacitors C13, C14, FIG. 3. The other pair of storage capacitors C2, C1, FIG. 5, respectively store Vf and Vn from the first pair of storage capacitors C13, C14, respectively. Output switches S4, S2 are connected between the first pair of storage capacitors C13, C14 and the second pair of storage capacitors C2, C1, respectively. Input pins 6 and 5 of difference amplifier U8B receive Vf and Vn from capacitors C2 and C1, respectively. The sample and hold circuitry includes the input pair of switches S3 and S1, one each for I1 and I2, respectively, responsive to the gating circuitry provided by the NAND gates and closed by the first gating signal at transition 57, Vsw1, FIG. 6, and opened by the second gating signal at transition 59. The sample and hold circuitry includes the output pair of switches S4 and S2, one each for I1 and I2, responsive to the gating circuitry and opened by the first gating signal at transition 51, Vsw2, FIG. 6, and closed by the third gating signal at transition 53. Op amp U4A is connected between C14 and S2 as a voltage follower to provide a buffer therebetween. Op amp U4B is connected between C13 and S4 as a voltage follower to provide a buffer therebetween. Op amp U4C is connected between S2 and one of the difference amplifier inputs at pin 5 of U8B as a voltage follower to provide a buffer therebetween. Op amp U4D is connected between S4 and input pin 6 of difference amplifier U8B as a voltage follower to provide a buffer therebetween.

Transition 51 of Vsw2, FIG. 6, is the beginning of the sampling interval. In response to transition 51 of Vsw2, switches S4 and S2 open. Waveform Vsw1 has a propagation delay of one more gate, U6A, in its generator circuit, as compared to Vsw2, i.e., Vsw2 is generated by Va, FIG. 2, through U6B, FIG. 2, while Vsw1 is generated by Va, FIG. 2, through U6C, FIG. 3, and U6A. Transition 57 of Vsw1, FIG. 6, will thus be slightly time-delayed from transition 51 of Vsw2 by a one gate propagation delay, U6A. Upon transition 57 of Vsw1, switches S3 and S1 close, and Vf and Vn are applied to respective capacitors C13 and C14. When Vsw1 transitions low at 59, which is the sample point 46, 48, FIG. 6, switches S3 and S1 open, and capacitors C13 and C14 hold the respective Vf1 and Vn1 voltage levels. When Vsw2 transitions at 53, FIG. 6, S4 and S2 close and buffers U4B and U4A apply the voltage levels Vf1 and Vn1 to C2 and C1, and establish Vf2 and Vn2.

Figure 5:
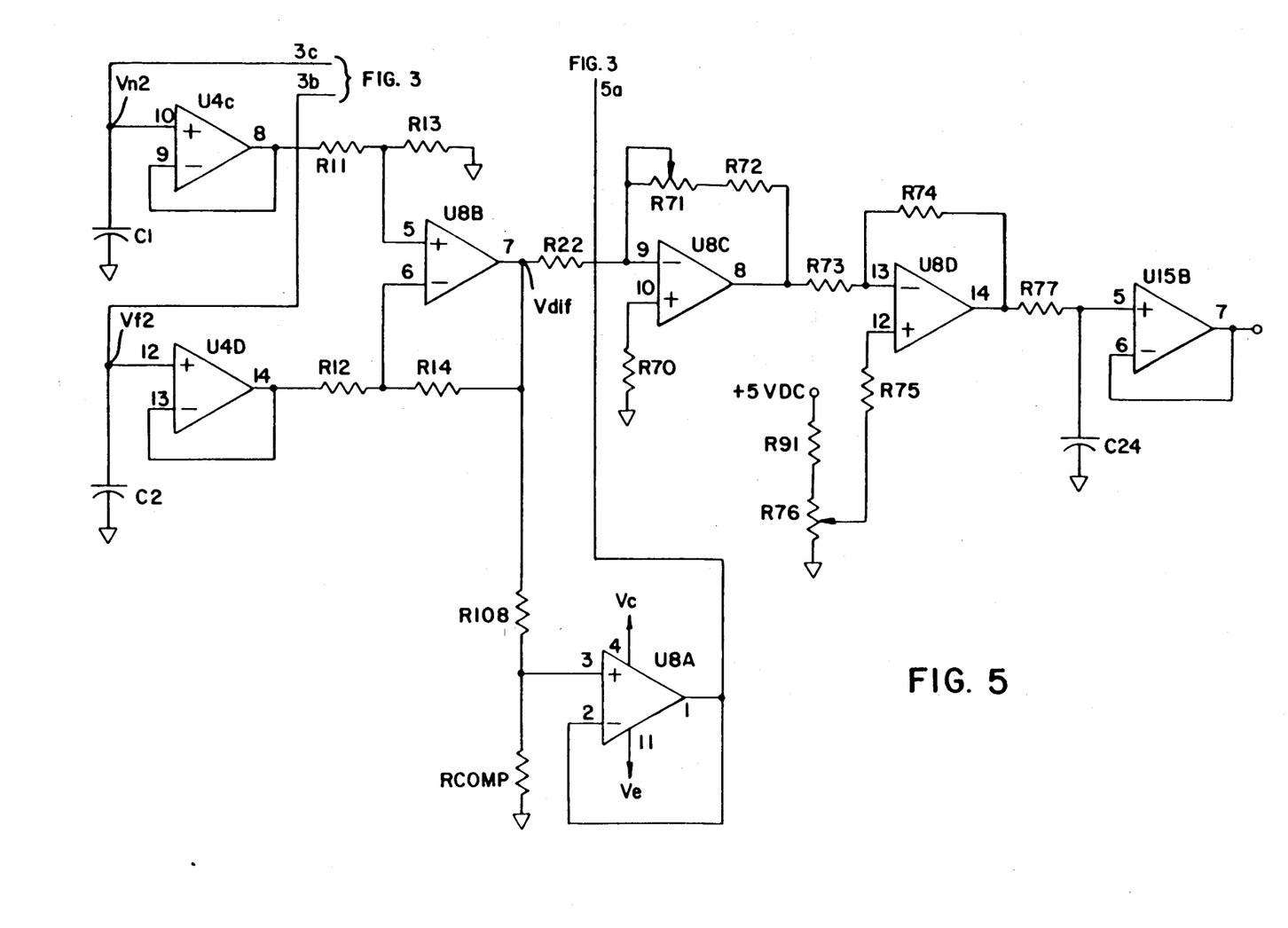

Difference amplifier U8B, FIG. 5, provides at output pin 7 a voltage waveform Vdif representing the difference I1−I2. Resistors R13 and R14 set the gain of amplifier U8B. Vdif, representing I1−I2, provides a measure of x, which is the position of the light spot along the surface of the PSD. Vdif is processed by an adjustable gain amplifier U8C, provided by another quarter of the above noted LM324 integrated circuit, and a voltage follower U8D, provided by another quarter of the noted LM324 integrated circuit, to give a calibratable analog output. Op amp U8C with potentiometer R71 in its feedback path provides the gain adjustment. Resistor R72 prevents short circuiting and provides better resolution of the potentiometer at the end of its range of adjustment. Op amp U8D provides the offset adjustment with potentiometer R76. Resistor R91 provides better resolution at the end of the range of adjustment of the potentiometer. Resistors R22, R70, R73 and R75 provide matching of input bias currents. Resistor R74 provides feedback. Operational amplifier U15B is provided by an LM324 integrated circuit, and is connected as a voltage follower to provide output buffering. Resistor R77 and capacitor C24 provide a filter. Potentiometers R71 and R76 provide gain adjustment and offset adjustment independently of each other.

The output pin 7 of difference amplifier U8B, FIG. 5, is connected by the voltage divider R108, Rcomp to the noninverting input pin 3 of operational amplifier U8A, which is provided by another quarter of the above noted LM324. integrated circuit. Op amp U8A is connected as a voltage follower, and its output at pin 1 is connected on line 5a through resistor R31, FIG. 3, to node 40 at input pin 2 of comparator U10 to vary the given threshold according to the value of the difference I1−I2. The difference I1−I2 does not vary linearly with position x. This nonlinearity is due to the ever decreasing change in angular reflection as the target spot moves farther away, i.e., as x increases, the difference I1−I2 does not increase as rapidly. To provide compensation for this nonlinearity, the threshold at node 40 is increased as Vdif increases, such that a higher sum I1+I2, represented by Vs, must be reached at pin 3 of U10 before Vcp at output pin 6 of U10 transitions high at 43, FIG. 6. This will slightly delay the sampling point 46, 48, FIG. 6, to a higher light intensity, whereby the difference I1−I2 as represented by Vdif will in turn be higher to provide the noted compensation.

The PSD is subject to ambient light as well as the light pulses from LED1. This can cause undesirable changes in the output. To reduce the effects of ambient light, compensation circuitry monitors the outputs of current-to-voltage converters U3 and U2 during the rest or nonsampling interval between pulses from LED1, i.e., during oscillator low state 26, FIG. 6. The ambient light compensation circuitry applies bias currents to the current-to-voltage converter inputs which cancel at least part of the PSD output generated by ambient light.

The ambient light compensation circuitry includes an operational amplifier U17, FIG. 4, provided by a CA3080 integrated circuit, and an operational amplifier U16, provided by a CA3080 integrated circuit. The output of converter U3 at pin 6 is applied to the noninverting input at pin 3 of op amp U17 through the voltage divider network provided by resistors R106 and R104. The output of op amp U17 at pin 6 is supplied through resistor R102 back to pin 2 of U3 to cancel the output current I1 from pin 1 of the PSD. Op amp U17 is disabled during the sampling interval when LED1 is pulsed on. Vsw2 on line 2a from NAND gate U6B, FIG. 2, is supplied through resistor R103, FIG. 4, and transistor Q13 to pin 5 of U17 which is referenced to Ve through resistor R107. During the sampling interval, which is oscillator state 24, FIG. 6, Vsw2 is low at 52, and transistor Q13 is off and removes the bias from pin 5 of U17 such that the latter is disabled. Capacitor C29, negatively charged through resistor R105, holds the compensation level during the sampling interval 24 when the PSD is receiving the light pulse from LED1. The ambient compensator provided by op amp U17 is a feedback system which tries to maintain a zero voltage at the output of converter U3 during oscillator state 26 between pulses from LED1, and hence the circuit will also tend to cancel offset voltage. The output of converter U2 at pin 6 is applied to the noninverting input of op amp U16 through the voltage divider network provided by resistors R100 and R98. The output of op amp U16 at pin 6 is supplied through resistor R96 back to pin 2 of U2 to cancel the output current I2 from pin 3 of the PSD. Op amp U16 is disabled during the sampling interval when LED1 is pulsed on. Vsw2 on line 2a from NAND gate U6B, FIG. 2, is supplied through resistor R97, FIG. 4, and transistor Q12 to pin 5 of U16 which is referenced to Ve through resistor R101. During the sampling interval, which is oscillator state 24, FIG. 6, Vsw2 is low at 52, and transistor Q12 is off and removes the bias from pin 5 of U16 such that the latter is disabled. Capacitor C28, negatively charged through resistor R99, holds the compensation level during the sampling interval 24 when the PSD is receiving the light pulse from LED1.

Out-of-range indication circuitry generates an out-of-range indication signal when the sum I1+I2 fails to reach the given threshold, i.e., Vs fails to reach Vt, FIG. 6, to indicate that the target is beyond the range of LED1. Vca at node 22, FIG. 2, which is the charge on capacitors C3, C19, is applied to the inverting input pin 13 of operational amplifier U1D, which is another fourth of the above noted MC34074 integrated circuit, to provide at output pin 14 of U1D the voltage waveform Vb, FIG. 6. Vb is fed back to input pin 12 of U1D, FIG. 2, through the voltage divider network provided by resistors R40, R41. Vb is also applied through resistor R42 to node 62. Vcp, FIG. 6, at output pin 6 of comparator U10, FIG. 3, is applied on line 3a through resistor R43, FIG. 2, to node 62. The signal at node 62 is applied through resistor R44 to the noninverting input of operational amplifier U1C, which is another fourth of the above noted MC34074 integrated circuit. The output of op amp U1C at pin 8 is fed back through resistor R46 to the noninverting input at pin 10. The inverting input at pin 9 of U1C provides a threshold reference connected through resistor R45 to a 5 volt source. The output of U1C at pin 8 is connected through diode D7 to charge capacitor C16. When capacitor C16 is charged to a sufficient level, it keeps transistor Q3 off, which in turn blocks conduction from the 5 volt source through LED DS5 and R48. Transistor Q3 is a P-channel VP061QT FET, field effect transistor. When the target is out of range, the sum I1+I2 does not rise to the given threshold, whereby Vs does not rise to Vt at point 41, FIG. 6, whereby Vcp at output pin 6 of U10 does not transition at 43, whereby less voltage is applied on line 3a to node 62, FIG. 2, whereby capacitor C16 has a reduced charge level, whereby transistor Q3 turns on, to in turn conduct current to LED DS5, which in turn emits light to provide the out-of-range indication signal.

It is recognized that various equivalents, alternatives and modifications are possible within the scope of the appended claims.

I claim:
1. An optical displacement measuring system comprising:
   a position sensitive device, PSD, having a pair of outputs providing electrical currents I1 and I2 satisfying the equation

$$x = \frac{I1 - I2}{I1 + I2}$$

where x is the position of a spot of light along a surface of the PSD reflected by a target from a light source, which in turn gives the target distance by triangulation;

ramp generator means periodically generating an increasing ramp voltage periodically energizing said light source to pulse said light source between on and off states;

comparator means comparing the sum I1+I2 against a given threshold as the sum I1+I2 increases with said increasing ramp voltage;

subtraction means sampling I1 and sampling I2 when said sum reaches said given threshold and outputting the difference I1−I2 to provide a measure of x.

2. The invention according to claim 1 comprising:

oscillator means having an output alternating between first and second output states at a given frequency;

capacitor means charging in one polarity during said first state of said oscillator means, and charging in the opposite polarity during said second state of said oscillator means;

and wherein said ramp generator means comprises switch means coupled to said light source and responsive to a given level of charge on said capacitor means to initiate energization of said light source and to continue energization of said light source to increasing intensity with increasing ramp voltage.

3. The invention according to claim 2 wherein said switch means energizes said light source with increasing ramp voltage until the end of said first state of said oscillator means, and wherein said light source is off during said second state of said oscillator means.

4. The invention according to claim 3 wherein said ramp generator means comprises an operational amplifier having an input connected to said capacitor means and an output connected to said switch means to drive the latter into conduction to energize said light source, wherein said oscillator means is also connected to said switch means to turn off the latter during said second state of said oscillator means, wherein said switch means is a semiconductor switch.

5. An optical displacement measuring system comprising:

a position sensitive device, PSD, having a pair of outputs providing electric current I1 and I2 satisfying the equation $$x = \frac{I1 - I2}{I1 + I2}$$

where x is the position of a spot of light along a surface of the PSD reflected by a target from a light source, which in turn gives the target distance by triangulation;

oscillator means having an output alternating between first and second output states at a given frequency;

capacitor means charging in one polarity during said first state of said oscillator means, and charging in the opposite polarity during said second state of said oscillator means;

ramp generator means periodically generating an increasing ramp voltage periodically energizing said light source to pulse said light source between on and off states, comprising switch means coupled to said light source and responsive to a given level of charge on said capacitor means to initiate energization of said light source and to continue energization of said light source to increasing intensity with increasing ramp voltage, said switch means energizing said light source with said increasing ramp voltage until the end of said first state of said oscillator means, and wherein said light source is off during said second state of said oscillator means;

comparator means comparing the sum I1+I2 against a given threshold as the sum I1+I2 increases with said increasing ramp voltage, said first state of said oscillator means having a first portion during which said sum I1+I2 increases to said given threshold, and a second portion during which said sum I1+I2 continues to increase until the end of said first output state;

subtraction means sampling I1 and sampling I2 when said sum reaches said given threshold, and outputting the difference I1−I2 to provide a measure of x, comprising:

sample and hold means sampling I1 and sampling I2 at the end of said first portion of said first state, and holding the sampled values of I1 and I2 until the end of said second portion of said first state, and outputting the sampled and held values of I1 and I2 at the end of said second portion of said first state, and a difference amplifier having a pair of inputs receiving said sampled and held values of I1 and I2 output from said sample and hold means, and having an output outputting the difference I1−I2.

6. The invention according to claim 5 comprising:

gating means responsive to said oscillator means and said comparator means and generating a first gating signal at the beginning of said first state, a second gating signal at the end of said first portion of said first state when said sum I1+I2 reaches said given threshold, and a third gating signal at the end of said first state;

and wherein said sample and hold means comprises:

an input pair of switches S3, S1, one each for I1 and I2, responsive to said gating means and closed by said first gating signal and opened by said second gating signal;

an output pair of switches S4, S2, one each for I1 and I2, responsive to said gating means and opened by said first gating signal and closed by said third gating signal.

7. The invention according to claim 6 comprising:

a pair of current-to-voltage converters U3, U2 responsive to said PSD and respectively converting I1 and I2 to voltages Vf and Vn;

a first pair of storage capacitors C13, C14 for respectively storing Vf and Vn at the end of said first portion of said first state, said pair of input switches S3, S1 being connected between said pair of current to voltage converters U3, U2 and said first pair of storage capacitors C13, C14, respectively;

a second pair of storage capacitors C2, C1 for respectively storing Vf and Vn from said first pair of storage capacitors C13, C14, said pair of output switches S4, S2 being connected between said first pair of storage capacitors C13, C14 and said second pair of storage capacitors C2, C1, respectively;

and wherein said pair of inputs of said difference amplifier receive Vf and Vn from C2 and C1, respectively.

8. The invention according to claim 7 comprising:
a first operational amplifier U4A connected between C14 and S2 as a voltage follower to provide a buffer therebetween;
a second operational amplifier U4B connected between C13 and S4 as a voltage follower to provide a buffer therebetween;
a third operational amplifier U4C connected between S2 and one of said pair of inputs of said difference amplifier as a voltage follower to provide a buffer therebetween;
a fourth operational amplifier U4D connected between S4 and the other of said pair of inputs of said difference amplifier as a voltage follower to provide a buffer therebetween.

9. The invention according to claim 5 further comprising in combination an adjustable gain amplifier U8C and an adjustable offset amplifier U8D connected in series with each other and connected to said output of said difference amplifier and being independently adjustable to provide independent gain and offset adjustment of said output of said difference amplifier.

10. An optical displacement measuring system comprising:
a position sensitive device, PSD, having a pair of outputs providing electrical current I1 and I2 satisfying the equation $$x = \frac{I1 - I2}{I1 + I2}$$

where x is the position of a spot of light along a surface of the PSD reflected by a target from a light source, which in turn gives the target distance by triangulation;
ramp generator means periodically generating an increasing ramp voltage periodically energizing said light source to pulse said light source between on and off states;
comparator means comparing the sum I1+I2 against a given threshold as the sum I1+I2 increases with said increasing ramp voltage;
subtraction means sampling I1 and sampling I2 when said sum reaches said given threshold and outputting the difference I1−I2 to provide a measure of x;
means connecting the output of said subtraction means to said comparator means to vary said given threshold according to the value of said difference I1−I2.

11. The invention according to claim 10 comprising:
a pair of current-to-voltage converters U3 and U2 responsive to said PSD and respectively converting I1 and I2 to voltages Vf and Vn;
and wherein said comparator means has a first input receiving Vf and receiving Vn, and a second input receiving a reference voltage and receiving said output of said subtraction means.

12. The invention according to claim 11 wherein said means connecting the output of said subtraction means to said comparator means comprises an operational amplifier U8A having an input connected to said subtraction means through a voltage divider to provide a voltage follower, and having an output connected to said second input of said comparator means to vary said given threshold.

13. An optical displacement measuring system comprising:
a position sensitive device, PSD, having a pair of outputs providing electrical current I1 and I2 satisfying the equation $$x = \frac{I1 - I2}{I1 + I2}$$

where x is the position of a spot of light along a surface of the PSD reflected by a target from a light source, which in turn gives the target distance by triangulation;
ramp generator means periodically generating an increasing ramp voltage periodically energizing said light source to pulse said light source between on and off states;
comparator means comparing the sum I1+I2 against a given threshold as the sum I1+I2 increases with said increasing ramp voltage;
subtraction means sampling I1 and sampling I2 when said sum reaches said given threshold and outputting the difference I1−I2 to provide a measure of x;
a first current-to-voltage converter U3 having an input responsive to said PSD and converting I1 to voltage Vf, and having an output outputting Vf to said comparator means and outputting Vf to said subtraction means;
a second current-to-voltage converter U2 having an input responsive to said PSD and converting I2 to voltage Vn, and having an output outputting Vn to said comparator means and outputting Vn to said subtraction means;
first ambient light compensation means monitoring said output of U3 during the time when said light source is off, and connected to U3 to compensate the input from said PSD to U3 generated by ambient light during the time when said light source is on;
second ambient light compensation means monitoring said output of U2 during the time when said light source is off, and connected to U2 to compensate the input from said PSD to U2 generated by ambient light during the time when said light source is on.

14. The invention according to claim 13 wherein:
said first ambient light compensation means is connected to said input of U3 and applies a bias current to cancel at least a part of I1 from said PSD to said input of U3;
said second ambient light compensation means is connected to said input of U2 and applies a bias current to cancel at least a part of I2 from said PSD to said input of U2.

15. The invention according to claim 14 wherein:
said first ambient light compensation means comprises:
an operational amplifier U17 having an input connected to said output of U3, and having an output connected to said input of U3;
gating means enabling U17 when said light source is off, and disabling U17 when said light source is on;

said second ambient light compensation means comprises:
an operational amplifier U16 having an input connected to said output of U2, and having an output connected to said input of U2;
gating means enabling U16 when said light source is off, and disabling U16 when said light source is on.

16. The invention according to claim 15 wherein:
said first ambient light compensation means comprises an energy storage capacitor C29 between said output of U17 and said input of U3 and holding a compensation level at said input of U3 when said light source is on and U17 is disabled;
said second ambient light compensation means comprises an energy storage capacitor C28 between said output of U16 and said input of U2 and holding a compensation level at said input of U2 when said light source is on and U16 is disabled.

17. The invention according to claim 16 comprising:
oscillator means having an output alternating between first and second output states at a given frequency, said first state of said oscillator means having a first portion during which said sum I1+I2 increases to said given threshold, and a second portion during which said sum I1+I2 continues to increase until the end of said first output state;
and wherein said gating means is responsive to said oscillator means and said comparator means and generates a first gating signal at the beginning of said first state, a second gating signal at the end of said first portion of said first state when said sum I1+I2 reaches said given threshold, and a third gating signal at the end of said first state, wherein U17 and U16 are disabled by said first gating signal, and enabled by said third gating signal.

18. An optical displacement measuring system comprising:
a position sensitive device, PSD, having a pair of outputs electrical current I1 and I2 satisfying the equation $$x = \frac{I1 - I2}{I1 + I2}$$

where x is the position of a spot of light along a surface of the PSD reflected by a target from a light source, which in turn gives the target distance by triangulation;
ramp generator means periodically generating an increasing ramp voltage periodically energizing said light source to pulse said light source between on and off states;
comparator means comparing the sum I1+I2 against a given threshold as the sum I1+I2 increases with said increasing ramp voltage;
subtraction means sampling I1 and sampling I2 when said sum reaches said given threshold and outputting the difference I1−I2 to provide a measure of x;
out-of-range indication means responsive to said comparator means and generating an out of range indication signal if said sum I1+I2 fails to reach said given threshold, to indicate that said target is beyond the range of said light source.

19. The invention according to claim 18 comprising:
oscillator means having an output alternating between first and second output at a given frequency, said first state having a first portion during which said sum I1+I2 increases to said given threshold, and a second portion during which said sum I1+I2 continues to increase until the end of said first output state;
gating means responsive to said oscillator means and said comparator means and generating a first gating signal at the beginning of said first state, a second gating signal at the end of said first portion of said first state when said sum I1+I2 reaches said given threshold, and a third gating signal at the end of said first state;
first capacitor means charging in one polarity during said first state of said oscillator means, and charging in the opposite polarity during said second state of said oscillator means;
second capacitor means charged in response to said first capacitor means and in response to said second gating signal;
a semiconductor switch Q3 controlled by the charge on said second capacitor means between an on state passing said indication signal and an off state blocking said indication signal, corresponding respectively to first and second charge levels of said second capacitor means, said first charge level of said second capacitor means being responsive to the charge of said first capacitor means in the absence of said second gating signal, said second charge level of said second capacitor means being responsive to the charge of said first capacitor means together with said second gating signal.

20. The invention according to claim 19 comprising:
a first operational amplifier U1D having an input connected to said first capacitor means, and having an output;
a second operational amplifier U1C having an input connected to the output of said first operational amplifier U1D and to the output of said comparator means, and having an output connected to said second capacitor means,
such that said second capacitor means is charged by the output of U1C to a first level by said first capacitor means and said second gating signal, and is charged to a second lower level in the absence of said second gating signal.

* * * * *